United States Patent [19]

Meyer et al.

[11] Patent Number: 5,035,108
[45] Date of Patent: Jul. 30, 1991

[54] MOWER DECK DEDICATED TO GRASS COLLECTION

[75] Inventors: Allen D. Meyer; John E. Hicks, both of Lincoln, Nebr.

[73] Assignee: Cushman Inc., Lincoln, Nebr.

[21] Appl. No.: 530,021

[22] Filed: May 29, 1990

[51] Int. Cl.⁵ .................... A01D 34/66; A01D 87/10
[52] U.S. Cl. .................................... 56/13.4; 56/17.5; 56/295; 56/320.2
[58] Field of Search .................. 56/6, 13.3, 13.4, 17.5, 56/255, 295, 320.2, DIG. 8, DIG. 17

[56] References Cited

U.S. PATENT DOCUMENTS

| | | | |
|---|---|---|---|
| 2,957,295 | 10/1960 | Brown | 56/17.5 X |
| 3,910,017 | 10/1975 | Thorud et al. | 56/295 |
| 4,114,353 | 9/1978 | Ansbaugh et al. | 56/13.3 |
| 4,149,358 | 4/1979 | Comer | 56/13.4 |
| 4,226,074 | 10/1980 | Mullet et al. | 56/6 X |
| 4,292,791 | 10/1981 | Lalonde | 56/255 |

FOREIGN PATENT DOCUMENTS

| | | | |
|---|---|---|---|
| 2949448 | 6/1981 | Fed. Rep. of Germany | 56/17.5 |
| 1380431 | 1/1975 | United Kingdom | 56/17.5 |

Primary Examiner—Ramon S. Britts
Assistant Examiner—David J. Bagnell
Attorney, Agent, or Firm—Reinhart, Boerner

[57] ABSTRACT

A mower deck including a shroud having a top, a discharge opening, first and second sides, the discharge opening located adjacent the second side and a peripheral skirt defining an open bottom, a plurality of cutting blades mounted to the shroud, each blade on a corresponding vertical drive shaft so as to cut plants and convey the clippings generated thereby from the first side to the second side and through the discharge opening, the drive shaft located closest to the discharge opening being provided with an impeller blade oriented at an angle to the corresponding cutting blade and adapted to direct the flow of cut plants toward the second side and through the discharge opening. The shroud also includes intake ports and a baffle which facilitates the flow of air and clippings from the first side to the second side.

14 Claims, 2 Drawing Sheets

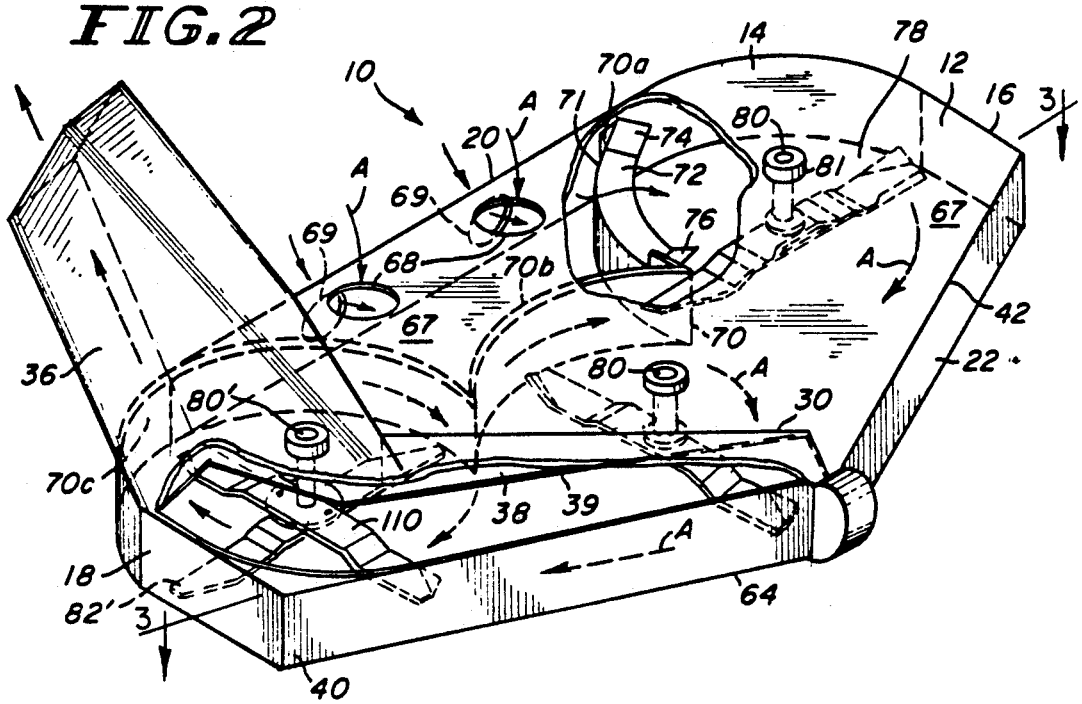
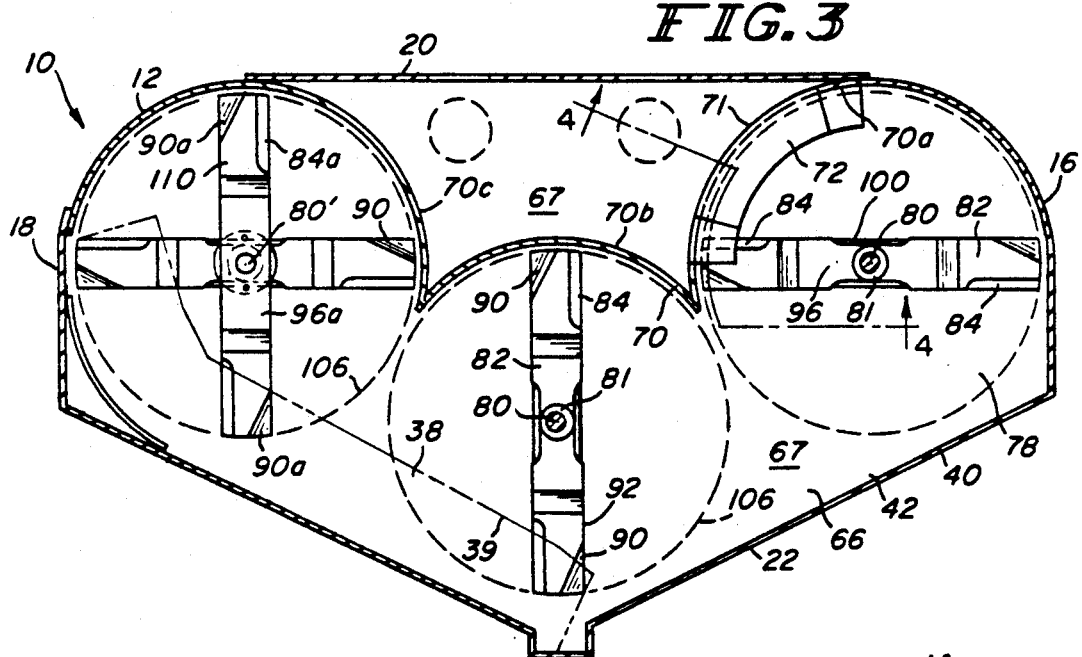
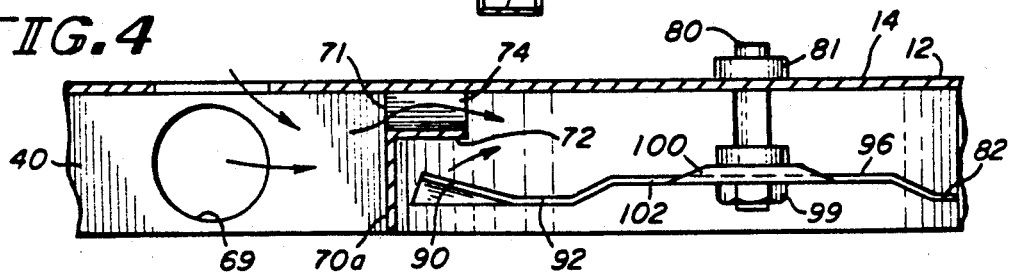

MOWER DECK DEDICATED TO GRASS COLLECTION

BACKGROUND OF THE INVENTION

The present invention relates to turf mowing machines adapted to be mounted in front of a tractor or other turf maintenance vehicle, and more specifically to a mower deck having an arrangement of blades adapted to direct the flow of cut grass towards a discharge opening of the deck.

The collection of debris and clippings associated with the cutting of turf or grass has been a problem long recognized in the turf care industry. Accordingly, a plurality of cutting and collecting devices exist in the prior art and are presently available. It is common for such devices to have a mower deck including a shroud or hood having a plurality of rotary cutter blades, as well as a discharge opening and an associated discharge chute or duct. Several such devices include a separate blower adapted to create a negative pressure which helps to draw the cuttings and debris initially collected within the shroud out through the discharge opening and through the duct into some type of collecting container.

A common drawback of conventional collection devices is that the associated mower deck is provided with inner formations configured so that the natural flow of cut grass is impeded, often resulting in grass collection passageways which become clogged or plugged with clippings and/or debris. This situation is aggravated when the mowed grass is wet.

A further drawback of conventional clipping collection devices is that the use of a supplemental blower increases production and maintenance costs related to the installation of additional gear boxes, belts, pulleys or other components.

U.S. Pat. Nos. 4,095,398 and 4,121,405 disclose one attempted solution to the above-identified drawbacks, in that clipping air flow is enhanced with a supplemental blower blade disposed coaxially with a cutter blade to increase the lift action thereof. However, in the '398 patent, the lift blade is used in conjunction with a supplemental blower, and in the '405 patent, the lift blade is provided in a circular, disc-like configuration which may obstruct the flow of cut grass into the discharge chute.

Thus, there is a need for a mower deck which is adapted so that sufficient negative pressure is generated to ensure an adequate clog-resistant flow of cut grass and debris into a collection container while not requiring the use of a supplemental blower. In addition, such a mower deck should be economical to produce and maintain.

SUMMARY OF THE INVENTION

Accordingly, the present invention provides a mower deck dedicated to grass collection which is adapted to enhance the flow of cut grass and debris through the mower housing and into a collection container without the use of a supplemental blower. The deck of the invention is designed to be effective even when operated in relatively tall and/or wet turf.

More specifically, the mower deck of the invention includes a shroud or hood having a top, a discharge opening, first and second sides, the discharge opening located proximate to the second side, and a peripheral skirt defining an open bottom. The deck further includes a plurality of rotary cutting blades, each blade mounted on a vertical spindle or shaft for axial rotation, the blades being mounted in a generally linear arrangement so as to cut plants and convey such plants from the first side to the second side and through the discharge opening. The arrangement of the cutting blades and the configuration of the housing interact to draw air in under negative pressure for directing the movement of the cuttings and other debris toward the second side. To this end, the spindle located closest to the discharge opening is provided with an impeller blade oriented at an angle to the corresponding cutting blade. The impeller blade creates additional negative pressure to direct the flow of cut grass and debris into the discharge opening, which is preferably located in the top of the shroud. In addition, the configuration of the shroud is designed to maximize airflow and to provide minimum obstruction to the flow of cut grass and debris through the discharge opening.

BRIEF DESCRIPTION OF THE DRAWING

FIG. 2 is a partial front perspective view of the mower deck of the invention, with parts broken away or removed for clarity;

FIG. 3 is a sectional view taken along the line 3—3 of FIG. 2 and in the direction indicated generally;

FIG. 4 is a sectional view taken along the line 4—4 of FIG. 3 in the direction indicated generally.

DESCRIPTION OF THE PREFERRED EMBODIMENT

Figure 1:
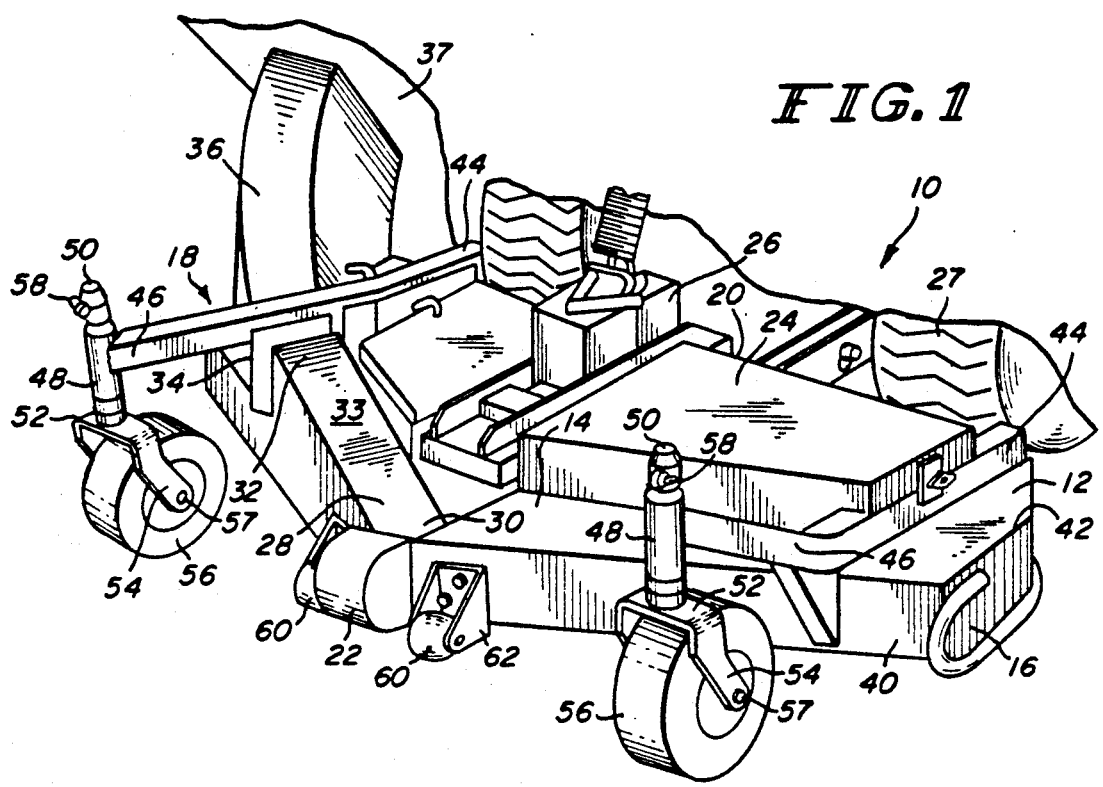
FIG. 1 is a front perspective view of the mower deck of the invention.

Referring to FIG. 1, the mower deck of the invention is indicated generally by the reference numeral 10. The mower deck 10 includes a shroud or hood 12 fabricated of steel or other suitable rigid material and having a generally wedge shaped top 14, a first side 16, a second side 18, a rear end 20 and a front end 22. The top 14 is provided with a pulley housing 24 for enclosing the blade drive system (not shown), and to which is attached a mounting bracket 26. The mounting bracket 26 is adapted to be releasably secured to a conventional self-propelled turf maintenance vehicle which is partially indicated at 27.

In addition to the housing 24, the top 14 includes a discharge chute 28 having a front end 30 and a rear end 32. In the preferred embodiment, the chute 28 is generally tubular in cross-section, and has a top 33 which is upwardly inclined from the front end 30 to the rear end 32. The chute 28 also has a port 34 into which a flexible discharge duct 36 is inserted. The flexible discharge duct 36 is connected to a cutting collection container partially shown at 37 which may be attached to the vehicle 27. The configuration of the chute 28 may be altered to suit the requirements of specific applications or machinery. An open bottom 38 of the discharge chute 28 is in communication with a discharge opening 39 (best seen in FIGS. 2 and 3) which is preferably located in the top 14, but may alternatively be located in the second side end 18 or the rear end 20.

A depending skirt 40 is integrally joined to a peripheral edge 42 of the top 14 and follows the general wedge-shaped configuration thereof. A pair of support wheel mounting arms 44 are mounted to the shroud 12 to project beyond the front end 22. Each arm 44 has a front end 46 to which is secured a vertically projecting sleeve 48. The sleeve 48 is adapted to accommodate a pin 50 of a mounting bracket 52 for axial pivoting action therein. The bracket 52 has a pair of depending arms 54 to which a wheel 56 is mounted for axial rotation about an axle 57. An upper end of the pin 50 is provided with a locking pin 58 which is adapted to secure the pin 50 within the sleeve 48. A pair of anti-scalp rollers 60 may be secured to the front end 22 and/or the rear end 20 of the shroud 12 by means of brackets 62. The wheels 56, the rollers 60 and related mounting assemblies maintain the position of the shroud 12 in adjustable spaced relation to the turf surface during operation.

Referring now to FIGS. 2-5, a lower edge margin 64 of the skirt 40 defines an open bottom 66 and an interior 67 of the shroud 12. The interior 67 of the shroud 12 is generally open and is without any narrow passages, close clearance fits of parts or areas of slow air velocities which may promote clogging or plugging of the shroud 12 or the discharge opening 39. Air is drawn into the interior area 67 through upper and rear ports 68, 69 respectively. The principal formation in the interior 67 of the shroud 12 is a curved baffle 70, each end of which is secured to the interior of the skirt 40. The baffle 70 is configured to have three arcuate portions 70a, 70b and 70c, each of which define a zone of rotation for a cutting blade. A section of the baffle portion 70a is provided at its upper end with an opening 71 which follows the curve of the baffle. The opening 71 is dimensioned to permit the passage of a sufficient volume of air into the area of the deck interior 66 where the cutting blades are located. A generally horizontally positioned guard plate 72 having upwardly angled ends 74 and 76 is secured to the baffle portion 70a to prevent the escape of clippings and other debris from the deck 10 in a reverse direction to the flow of air through the deck, as is indicated by the arrows A (best seen in FIG. 2). To optimize air flow though the deck, the combined surface area of the ports 68 and 69 should be equal to or greater than the surface area of the opening 71.

The baffle 70 defines a cutting chamber 78 within the deck interior 67. Within the cutting chamber 78 are located a plurality of vertical drive shafts or spindles 80, which in the preferred embodiment number three; however, the use of fewer or additional spindles 80 is contemplated. Each spindle 80 is provided with a retaining collar 81 and an elongated, generally planar rotary cutting blade 82.

Figure 5:
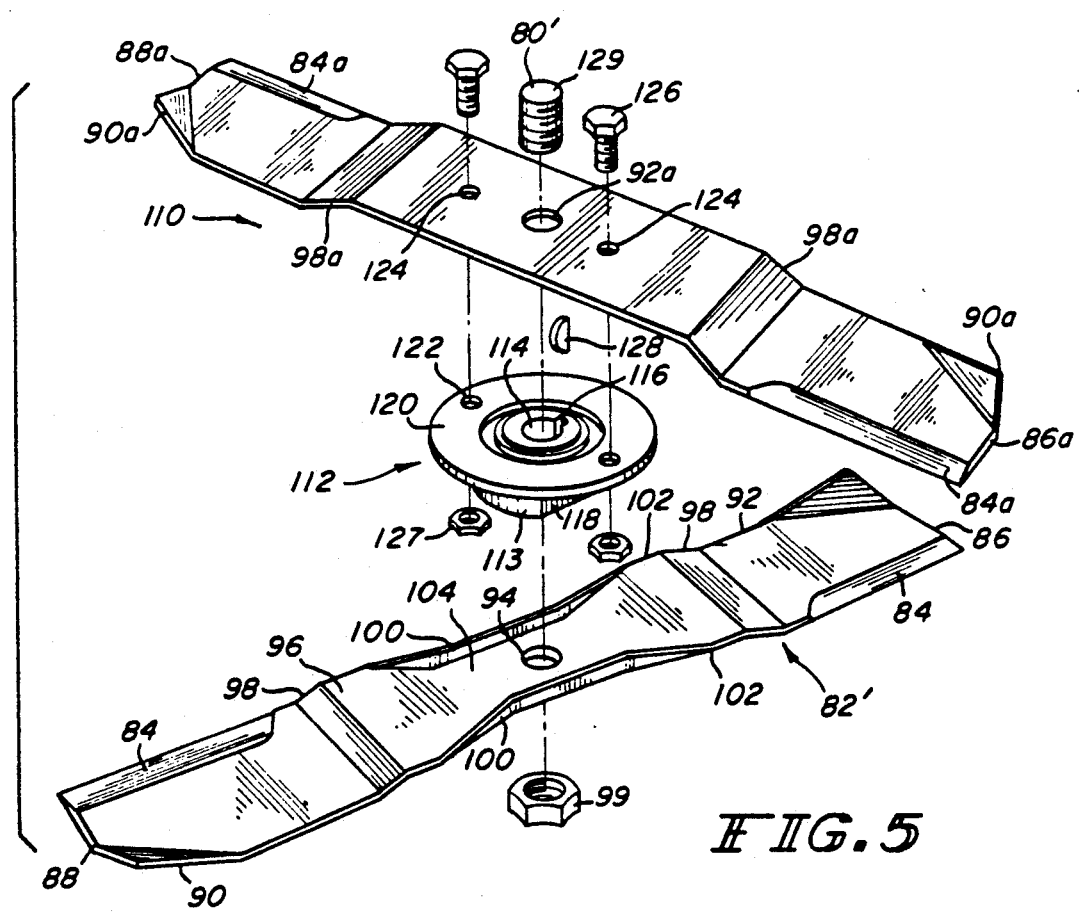
FIG. 5 is a exploded front perspective view of the impeller and rotary lift blades shown in FIGS. 2 and 3.

Referring now to FIG. 5, each blade 82 is provided with a sharpened leading side edge portion 84 at first and second ends thereof, designated 86 and 88 respectively. The leading edges 84 of the ends 86, 88 are on opposite side edges of the blade 82. The blades 82 are preferably rotary lift blades, so designated because of an upwardly angled sail portion 90 which is located on a trailing edge portion 92 of each blade end 86, 88. The sail portion 90 generally acts as an air foil to impart the airflow within the chamber 78 a combination of upward, inward, and forward linear velocities. The operation of the blade 82 with its sail portion 90 is described in detail in commonly assigned U.S. Pat. No. Re. 32,377, the contents of which are incorporated by reference herein.

Each blade 82 matingly engages a respective spindle 80 by means of a central bore 94. The bore 94 is centrally located in a central planar portion 96 of the blade 82, the central portion being vertically offset from the horizontal plane of the end portions 86, 88 by means of a pair of shoulders 98. The lowered relationship of the cutting edges 84 relative to the bore 94 keeps non-cutting portions of the blade 82 above the uncut grass and debris to reduce operational friction of the individual blades, and of the deck 10 as a whole. In addition, the offset central portion 96 allows the mounting locknut 99 which secures the blade 82 upon the spindle 80 to be disposed at or above the horizontal plane of the cutting edges 84 (best seen in FIG. 4).

The blade 82 is also provided with a pair of raised walls 100 on opposing edges 102 in the area of the bore 94. The walls 100 define a channel section 104 which stiffens the blade 82 and minimizes bending stresses. The walls 100 preferably do not extend to the shoulders 98, since it has been found that longer walls define a longer channel which is disruptive to the air flow within the cutting chamber 78. More specifically, the longer type of channel enhances the flow of air along the longitudinal axis of the blade 82 and off the ends 86, 88, disrupting the desired air flow patterns depicted by the arrows A. An additional function of the channel walls 100 is to create flat spots for mounting hardware such as a blade driver and the locknut 99 which are used to secure the blade 82 to the spindle 80.

Referring now to FIGS. 2 and 3, the spindles 80 are disposed in the shroud 12 in a generally linear arrangement, so that a circular cutting swath 106 circumscribed by each of the cutting blades 82 does not intersect the swath of the next adjacent blade. In mower decks of this type, the rotating action of the cutting blades 82 serves to create a certain amount of negative pressure which, under ideal cutting conditions, draws cut grass or other debris upwardly into the shroud 12, and generally effects air-entrained passage of clippings outwardly from each blade 82 from the first side 16, generally toward the second side 18 and into the discharge opening 39. However, when grass is wet or unusually tall, this ideal flow of cuttings may be curtailed, and cut grass may clog or plug the interior 67 of the shroud 12 and/or the discharge opening 39.

In many conventional mowers, a supplemental blower is provided to increase the negative pressure in the discharge chute 28, the discharge duct 36 as well as within the shroud 12 in order to prevent such clogging or plugging. The use of supplemental blowers is expensive in terms of production and maintenance costs and has been deemed not to be a cost effective solution to the clogging problem.

Referring now to FIGS. 2, 3 and 5, in the deck 10 of the present invention, the spindle 80' located adjacent the side 18 is provided with an impeller blade 110 which is located upon the spindle 80' so as to be oriented coaxial with, yet an angle 'α' to the "discharge" cutting blade 82'. In the preferred embodiment, α is approximately 90°; however, other angular positions are contemplated. The impeller blade 110 is similar in configuration to the blades 82, having a cutting surface 84a, a bore 92a, and a sail 90a at each end 86a, 88a, and shoulders 98a. The blade 110 differs from the blades 82 mainly in the lack of any raised channel walls 100. In addition, the shoulders 98a have a height which is slightly taller than the height of the shoulders 98. The impeller blade 110 is disposed above the cutting blade 82' so that the cutting surfaces 84a are located one blade thickness above the cutting surface 84. Since the primary purpose of the impeller blade 110 is to lift air and not to cut grass, the slightly raised height of the blade 110 will reduce blade/grass contact and the resulting additional friction.

Referring now to FIG. 5., the attachment of the rotary cutting blade 82' and the impeller blade 110 to the spindle 80' is shown in greater detail. The impeller blade 110 is located uppermost, with a blade driver 112 located between the blades 110 and 82'. The driver 112 is generally cylindrical, with a sidewall 113 and an axial bore 114 having a keyway 116. A pair of diametrically opposed flat spots 118 are located in the sidewall 113 to engage the channel walls 100 of the blade 82'. The driver 112 also includes an upper flange 120 which extends radially outwardly from the driver, and which has at least one and preferably two mounting bores 122. The bores 122 are located upon the flange 120 so as to be in register with similar mounting bores 124 on the impeller blade 110. The impeller blade 110 is then secured to the driver 112 by threaded fasteners 126, such as bolts with locknuts 127.

Once the impeller blade 110 is secured to the driver 112, the combined driver and blade assembly is then placed upon the spindle 80', and is lockingly secured thereto by a key 128 which engages a keyway 129 on the spindle 80' and the keyway 116. The driver 112 is secured between the channel walls 100 so that the blades 82', 110 will be situated at an angle α relative to each other, the angle α preferably being on the order of 90°. The locknut 99 then secures the blade 82' to the spindle 80' so that the walls 100 engage the flat spots 118.

In operation, the rotation of the rotary blades 82 and 82' in the same direction draws a flow of air into the intake ports 68, 69 and through the opening 71. This flow of air, combined with the configuration of the baffles 70a, b, c, generates a flow of cut grass and debris which, through the uplifting action of the blades 82, is lifted from the turf surface and directed towards the side 18 of the shroud 12. The additional negative pressure created by the impeller blade 110, in conjunction with the action of the cutting blade 82', assists in drawing the cut grass and debris from the first side 16 to the second side 18, and also pulls the clippings upwardly for passage through the discharge opening 39.

Consequently, the interior of the shroud 12 may be kept generally clog or plug free by the additional negative pressure created by the impeller blade 110, operating in conjunction with the generally restriction free design of the shroud 12. Also, the configuration of the shroud 12 facilitates the unplugging thereof if such conditions should occur. The placement of the discharge chute 28 upon the top 14 of the shroud 12 allows for a narrow, well balanced unit which is capable of trimming on both sides 16, 18 of the deck 10. If desired, the shroud 12 may alternately be adapted for side or rear discharge.

While a particular embodiment of the mower deck of the invention has been shown and described, it will be appreciated by those skilled in the art that changes and modifications may be made thereto without departing from the invention in its broader aspects and as set forth in the following claims.

What is claimed is:

1. A mower deck adapted to be propelled along the ground, comprising:

a shroud having a top, a first side, a second side, a depending peripheral skirt defining an open bottom, a discharge opening being associated with said second side and baffle means being configured to separate an air intake interior area located on one side of said baffle means and a cutting chamber located on the other side of said baffle means, said air intake region having an intake port in said shroud and on said one side of said baffle means;

cutter means located within said shroud and including at least two rotary cutter blades, each said blade mounted on a corresponding vertical drive shaft, one of said drive shafts being located adjacent to said discharge opening, said blades rotating axially in the same direction and forming a cutting path extending from said first side to said second side, each said blade adapted to cut plants within a portion of said path and to advance the clippings generated thereby downstream to the blade disposed next adjacent thereto and toward said second side; and said drive shaft disposed adjacent to said discharge opening being provided with an impeller blade being coaxial with, and oriented at an angle to, said respective cutter blade to draw the flow of plant clippings from said open bottom and generally from said first side to said second side of said shroud and to transmit said clippings through said discharge opening.

2. The mower deck as defined in claim 1 further including a baffle opening into said cutting chamber and in communication with said intake port and said intake port having a surface area opening greater than said baffle opening.

3. The mower deck as defined in claim 1 wherein said impeller blade is oriented at an approximate 90° angle to said respective cutter blade.

4. The mower deck as defined in claim 3 wherein said impeller blade is located above said respective cutter blade on said drive shaft.

5. The mower deck as defined in claim 3 wherein said impeller blade has a substantially planar central portion which is vertically offset from a generally horizontal portion at each end thereof.

6. The mower deck as defined in claim 5 wherein said impeller blade is provided with an upwardly projecting sail at each end thereof.

7. A mower deck adapted to be propelled along the ground, comprising:

a shroud having a top, a first side, a second side, a depending peripheral skirt defining an open bottom, and a discharge opening being associated with said second side, at least one intake port and baffle means located within said shroud, said baffle means configured to define a cutting chamber having cutter blades and said baffle means circumscribing a cutting swath for each of said cutter blades;

cutter means located within said shroud and including at least two of said cutter blades, each said blade mounted on a corresponding vertical drive shaft, one of said drive shafts being located adjacent to said discharge opening, said blades rotating axially in the same direction and forming a cutting path extending from said first side to said second side, each said blade adapted to cut plants within a portion of said path and to advance the clippings generated thereby downstream to the blade disposed next adjacent thereto and toward said second side; and said drive shaft disposed adjacent to said discharge opening being provided with an impeller blade being coaxial with, and oriented at an angle to, said respective cutter blade to draw the flow of plant clippings from said open bottom and generally from said first side to said second side of said shroud and to transmit said clippings through said discharge opening.

8. The mower deck as defined in claim 7 wherein said baffle means has an opening located near said first side of said shroud, said opening in said baffle being in communication with said intake port.

9. The mower deck as defined in claim 8 wherein said opening in said baffle means is provided with a guard which extends laterally into said cutting chamber.

10. A mower deck adapted to be propelled along the ground, comprising:
   a shroud having a top, a first side, a second side, a discharge opening in said top adjacent said second side, at least one intake port, and a skirt depending from a peripheral edge of said top and defining an open bottom;
   a plurality of vertical drive spindles depending from said top;
   at least two cutter blades, each said blade mounted on a corresponding one of said vertical spindles for axial rotation, said blades located within said shroud to form a cutting path extending from said first side to said second side, each said blade adapted to cut plants within a portion of said path and to advance clippings from said cut plants toward said second side and said discharge opening;
   said vertical spindle disposed in closest proximity to said discharge opening being provided with an impeller blade located above and coaxial with said respective cutter blade, and disposed at an angle thereto, said impeller blade adapted to direct the flow of said clippings upwardly into said discharge opening; and
   baffle means located within said shroud and configured to define a cutting chamber which encloses said cutter blades, said baffle means further including an opening in communication with said intake port.

11. The mower deck as defined in claim 10 wherein said impeller blade is disposed at an approximate 90 degree angle to said corresponding cutter blade.

12. The mower deck as defined in claim 10 wherein said baffle means has a guard disposed along a lower edge of said opening to project laterally into said cutting chamber.

13. A blade assembly for a mower deck adapted to be propelled along the ground, said mower deck having a shroud with a discharge opening and a top and at least one drive spindle depending vertically from said top, said assembly comprising:
   a generally planar rotary cutter blade having a pair of side edges, a center portion and two end portions, said center portion being vertically offset from each of said end portions by a pair of shoulders, said center portion also having an axial bore and a vertically projecting channel wall on each of said side edges, each of said end portions having cutting edge and a sail portion on an edge opposite said cutting edge;
   a generally cylindrical blade driver having a cylindrical sidewall, an upper end and a central bore, a pair of opposing flat spots in said sidewall configured to be engaged by said channel walls, and a flange projecting radially laterally from said upper end;
   a generally planar impeller blade having a pair of side edges, a center portion and two end portions, said center portion being vertically offset from each of said end portions by pair of shoulders, said center portion also having an axial bore being in register with said bore of said cutter blade and mounting means for engaging said flange on said driver so that said impeller blade is disposed on the spindle to be slightly above, and at an angle relative to, said rotary cutter blade, each of said end portions having a cutting edge on one of said side edges and a sail portion on said side edge opposite said cutting edge; and
   retaining means for retaining said rotary blade, said driver and said impeller blade coaxially and lockingly on the spindle.

14. The blade assembly as defined in claim 13 wherein said respective shoulders of said cutter blade and said impeller blade each have a height, said height of said shoulders of said impeller blade being taller than said height of said shoulders of said cutter blade.

* * * * *